Aug. 3, 1926.
R. J. BROEGE
PISTON PIN RETAINER
Filed April 21, 1924
1,594,403
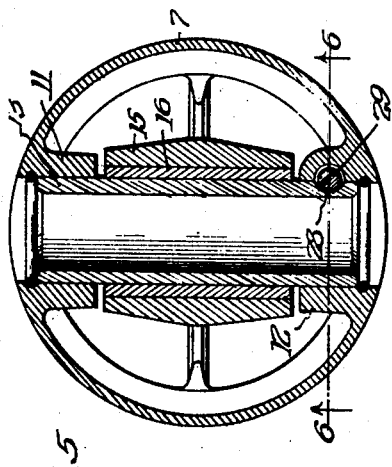
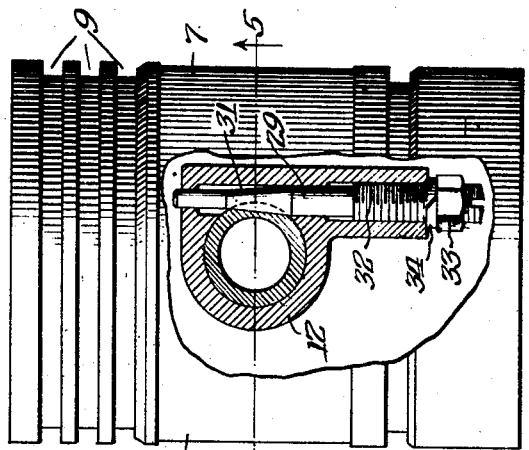
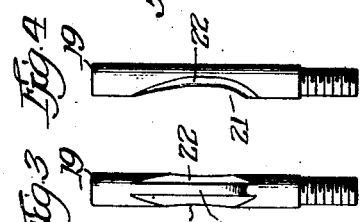
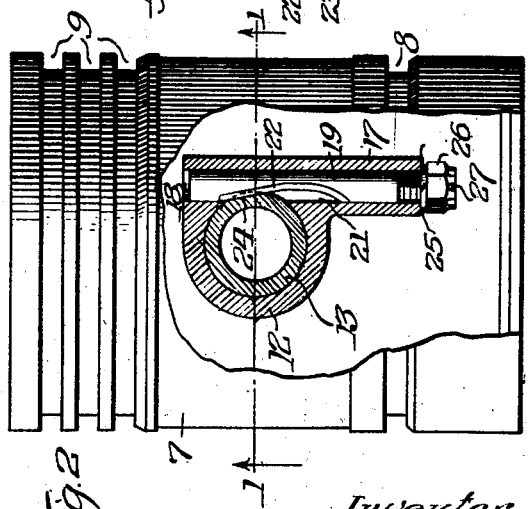
Inventor
Robert J. Broege Patented Aug. 3, 1926.

1,594,403

UNITED STATES PATENT OFFICE.

ROBERT J. BROEGE, OF HARVEY, ILLINOIS, ASSIGNOR TO THE BUDA COMPANY, OF HARVEY, ILLINOIS, A CORPORATION OF ILLINOIS.

PISTON-PIN RETAINER.

Application filed April 21, 1924. Serial No. 707,807.

This invention relates to retainers for holding a piston pin against rotation and longitudinal displacement. While the invention is shown herein as applied to a piston pin by which the connecting rod is attached to a piston of the type adapted to be employed in an internal combustion engine, it should be understood that my invention is not restricted in its use to this limited field.

In internal combustion engines where the piston pin is subjected to violent thrusts of the pistons which are transmitted through the pin to the connecting rod, and thence to the crankshaft, it is highly desirable that the piston pin be held rigidly in place so that it can neither rotate nor move longitudinally, or otherwise wear would result causing the pin to become loose in the piston journals.

The primary purpose of my present invention, therefore, is to provide a retainer for a piston pin which will securely hold the pin against movement in the piston.

Another purpose of the invention is to provide a retainer which can be economically manufactured and which can be readily installed in position and securely locked against displacement. Furthermore, the retainer is so designed that it may be adjusted and tightened should it become necessary or desirable at any time to do so.

For the purpose of facilitating an understanding of my invention I have illustrated on the accompanying drawing preferred embodiments thereof, from inspection of which, when considered in connection with the following description, my invention and many of its attended advantages should be readily understood and appreciated.

Referring to the drawing,—

Fig. 1 is a transverse sectional view through a piston equipped with my invention and taken on the line 1—1 of Fig. 2.

Fig. 2 is a sectional view on the line 2—2 of Fig. 1.

Figs. 3 and 4 are front and side elevations, respectively, of the form of retainer shown in Figs. 1 and 2.

Fig. 5 is a view similar to Fig. 1 showing a modified form of my invention, this view being taken on the line 5—5 of Fig. 6, and Fig. 6 is a sectional view on the line 6—6 of Fig. 5.

Referring to the drawing more in detail and particularly Figs. 1 to 4 thereof, reference character 7 indicates generally a piston of any preferred construction, preferably suitable for use in an internal combustion engine and provided with the usual ring grooves 8 and 9. The piston is provided, as is customary, with the inwardly extending journals 11 and 12 adapted to snugly receive the piston pin 13. The usual split retaining rings 14 may be disposed at the ends of the piston pin to insure against longitudinal displacement of the pin, although when my present invention is employed these rings may be dispensed with if desired. The connecting rod 15 is journaled on the piston pin in the usual manner and a wearing bushing 16 is preferably interposed between the piston pin and the head of the connecting rod.

One of the journals 12 is provided at one side with a downward extension 17 and is longitudinally cored to provide a bore 18 adapted to slidingly receive the retaining member 19. This member is dished or longitudinally recessed at one side as indicated by 21, the dished portion being preferably transversely tapered as indicated at 22 providing a relatively narrow locking rib 23.

The bore 18 as will be apparent from Figs. 1 and 2, intersects the bore of the journal 12 near one side thereof so that the piston pin 13 disposed in the journal projects into the bore 18. The recess in the side of the retaining member 19 is of sufficient depth so that when this member is positioned with the deepest portion of the recess opposite to the piston pin the member is totally disengaged from the pin, consequently the pin may be removed longitudinally from its journals for repairs or renewal. The piston pin is provided at the point where it intersects the bore 18 with a transversely extending groove 24 adapted to receive the rib 23, whereby the pin is held against both rotary and longitudinal movements as will be apparent from inspection of Figs. 1 and 2.

In assembling the device the retaining member 19 is inserted in the bore 18 until the cut away portion is opposite the bore of the piston pin journal. This position of the retaining member affords clearance for the insertion of the piston pin 13 into its journals, with the groove 24 therein disposed in alignment with and in position to receive the rib 23 of the retaining member. The retaining member is then slid downwardly in its guiding bore to engage the rib 23 in the groove 24, whereupon the spring washer 25 and the nut 26 are engaged with the lower projecting end of the retaining member. The nut is tightened up to draw the retaining member snugly into retaining relation with the piston pin so as to firmly hold the pin against both longitudinal and rotary movements. The cotter pin 27 may be employed to secure the nut 26 against rotation.

In the form of the invention disclosed in Figs. 5 and 6 the piston pin is provided with a somewhat larger groove 28 and the retaining member 29 is tapered upwardly as indicated by reference character 31, to engage in the groove 28. The lower portion of the bore in which the retaining member 29 is disposed is tapped for threaded engagement with the threaded portion 32 of the retaining member.

In assembling this construction the piston pin is first placed in position, whereupon the retaining member is screwed into its bore until the tapered portion 31 of the member snugly engages the groove 28 to lock the piston pin against movement. The retaining member is then locked against accidental displacement by means of the lock-nut 33 and the interposed spring washer 34. In both constructions the retaining members may be tightened up at any time if it should become necessary by tightening up the nut 26 in the construction shown in Fig 2 or by loosening the nut 33 shown in Fig. 6, then threading the retaining member further into its bore and then tightening up the lock-nut.

It should be apparent from the foregoing that I have provided a piston pin retainer which will securely hold the piston pin against both longitudinal and rotary movements and that a device embodying my invention is simple in construction and economical to manufacture and may be quickly and easily installed and subsequently adjusted if necessary. The structural details illustrated and described may be varied within considerable limits without exceeding the scope of the invention, as defined in the following claims.

I claim:

1. The combination with a piston provided with transverse piston pin journals and a longitudinally extending retaining member bearing intersecting one of said journals, of a piston pin disposed in said journals and having a transverse groove aligned with said retaining member bearing, a retaining member disposed in said bearing, said retaining member having a cut-away portion and a rib protruding therefrom, said cut-away portion and rib being so shaped that the said retaining member may be adjusted to prevent longitudinal and rotary movement of said pin or to disengage said parts to permit the withdrawal of said pin.

2. The combination with a piston provided with transverse piston pin journals and a longitudinally extending retaining member bearing intersecting one of said journals, of a piston pin disposed in said journals and having a transverse groove aligned with said retaining member bearing, a retaining member, said retaining member having an arcuate cut-away portion, a rib extending outward from and along the face of said arcuate cut-away portion and adapted to enter said groove at a certain position thereof to prevent longitudinal and rotary movement of said pin, and at another position permit the removal of said pin from its journals without the removal of said retaining member.

ROBERT J. BROEGE.